United States Patent
Jeong et al.

(10) Patent No.: US 9,515,748 B2
(45) Date of Patent: Dec. 6, 2016

(54) ENCODING APPARATUS AND METHOD FOR ENCODING SOUND CODE, DECODING APPARATUS AND METHOD FOR DECODING THE SOUND CODE

(71) Applicant: Powervoice Co., Ltd., Bucheon-si (KR)

(72) Inventors: Hee Suk Jeong, Gimpo-si (KR); Se Hun Chin, Incheon (KR); Hyung Yup Lee, Yongin-si (KR); Jong Sang Tack, Chuncheon-si (KR)

(73) Assignee: POWERVOICE CO., LTD. (KR)

( * ) Notice: Subject to any disclaimer, the term of this patent is extended or adjusted under 35 U.S.C. 154(b) by 6 days.

(21) Appl. No.: 14/494,671

(22) Filed: Sep. 24, 2014

(65) Prior Publication Data
US 2015/0088495 A1   Mar. 26, 2015

(30) Foreign Application Priority Data
Sep. 24, 2013 (KR) .................. 10-2013-0113499

(51) Int. Cl.
| | | |
|---|---|---|
| G10L 19/00 | (2013.01) | |
| H04B 11/00 | (2006.01) | |
| G10L 25/90 | (2013.01) | |
| G01S 5/22 | (2006.01) | |

(52) U.S. Cl.
CPC .............. H04B 11/00 (2013.01); G01S 5/22 (2013.01); G10L 25/90 (2013.01)

(58) Field of Classification Search
CPC ............ G10L 25/90; H04L 2012/6481; H04M 2201/40; H04M 3/002; H04Q 1/45
USPC ....... 704/214, 208, 215, 217, 211, 225, 226, 704/205; 379/93.05, 93.31
See application file for complete search history.

(56) References Cited

U.S. PATENT DOCUMENTS

| | | | | |
|---|---|---|---|---|
| 5,774,844 A * | 6/1998 | Akagiri | ................ | H04B 14/046 704/215 |
| 7,653,536 B2 * | 1/2010 | Tackin | .................... | G10L 25/90 704/208 |
| 8,583,427 B2 * | 11/2013 | Tackin | .................... | G10L 25/90 704/208 |

(Continued)

FOREIGN PATENT DOCUMENTS

| | | |
|---|---|---|
| CN | 1663154 | 8/2005 |
| CN | 1781272 | 5/2006 |

(Continued)

*Primary Examiner* — Vijay B Chawan
(74) *Attorney, Agent, or Firm* — Cantor Colburn LLP

(57) ABSTRACT

A decoding apparatus includes a sound code input unit that receives a sound code output from an encoding apparatus through a sound wave reception device; a frame division unit that divides the sound code depending on a predetermined time interval to generate a plurality of frames; a frequency identification unit that identifies a frequency corresponding to each of the plurality of the frames through frequency analysis for each of the plurality of the frames; and an information generation unit that determines a frequency band, to which each of the identified frequencies corresponds, from an audible sound wave frequency band and a non-audible sound wave frequency band, and a plurality of partial information based on the frequency band and each of the identified frequencies, and generates information corresponding to the sound code based on the plurality of the partial information.

17 Claims, 14 Drawing Sheets

(56) References Cited

U.S. PATENT DOCUMENTS

| | | | | |
|---|---|---|---|---|
| 2005/0031097 A1* | 2/2005 | Rabenko | ............... | H04B 3/23 |
| | | | | 379/93.31 |
| 2008/0243491 A1* | 10/2008 | Matsuoka | ............. | H04B 11/00 |
| | | | | 704/201 |
| 2009/0052642 A1* | 2/2009 | Tackin | ............... | H04M 7/006 |
| | | | | 379/93.05 |
| 2010/0191525 A1* | 7/2010 | Rabenko | ............... | H04B 3/23 |
| | | | | 704/211 |
| 2010/0198590 A1* | 8/2010 | Tackin | ............... | G10L 25/90 |
| | | | | 704/214 |

FOREIGN PATENT DOCUMENTS

| | | |
|---|---|---|
| CN | 101218768 | 7/2008 |
| CN | 103248434 | 8/2013 |
| JP | 1992051799 | 2/1992 |
| KR | 1020070035552 | 3/2007 |
| KR | 1020080072224 | 8/2008 |
| KR | 1020130082337 | 7/2013 |
| WO | 2011055410 | 5/2011 |

* cited by examiner

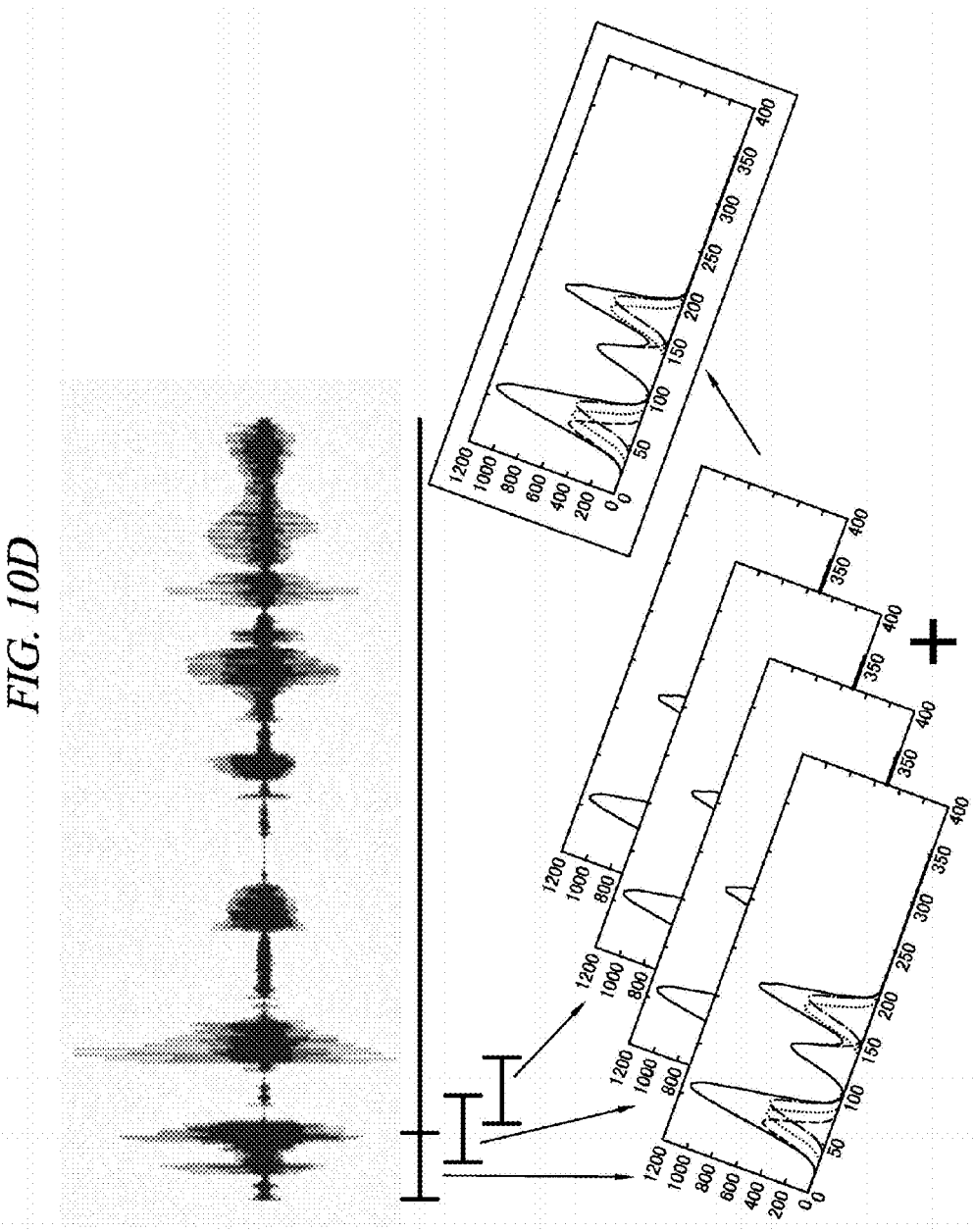

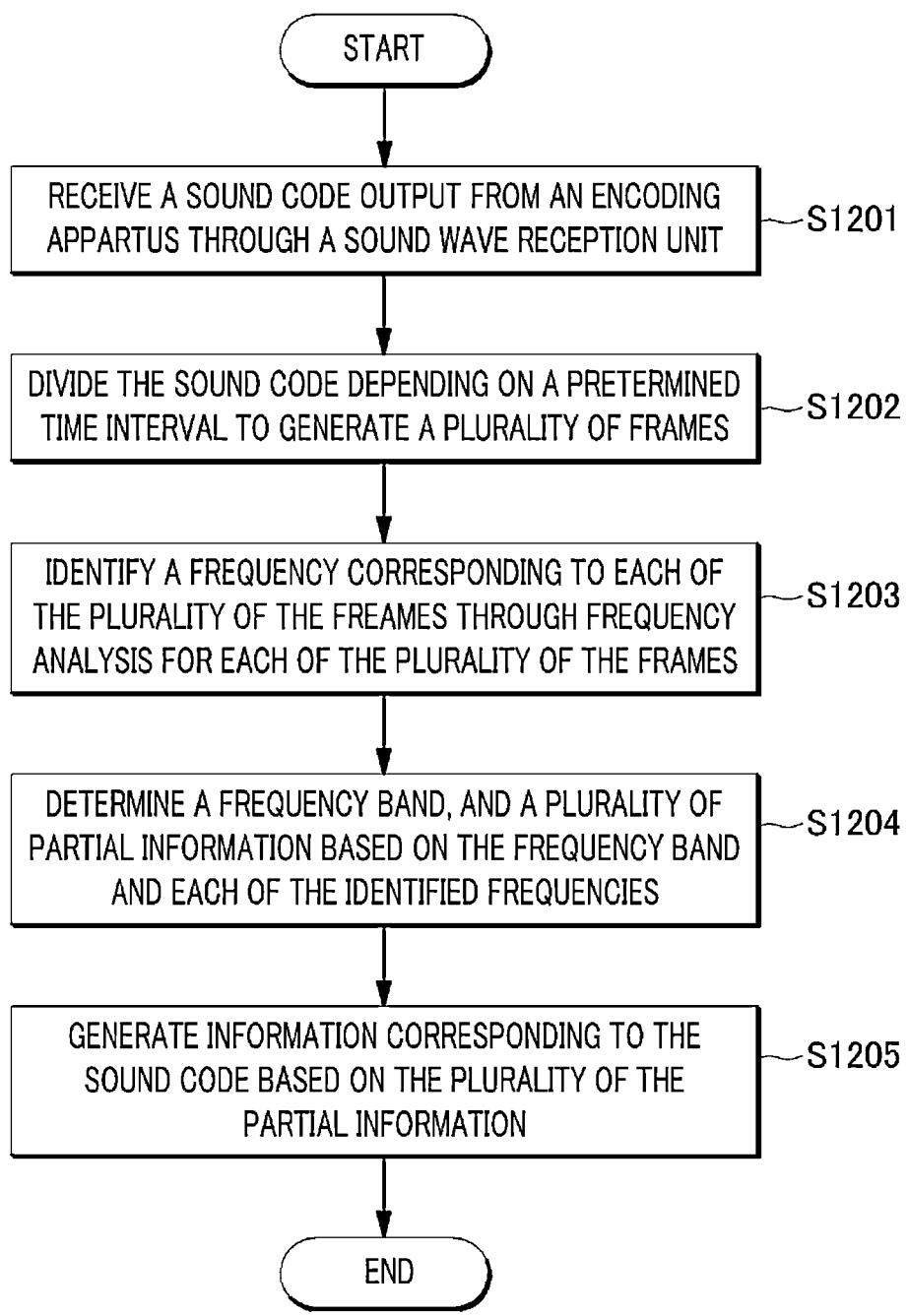

ENCODING APPARATUS AND METHOD FOR ENCODING SOUND CODE, DECODING APPARATUS AND METHOD FOR DECODING THE SOUND CODE

CROSS-REFERENCE TO RELATED APPLICATION

This application claims the benefit of Korean Patent Application No. 10-2013-0113499 filed on Sep. 24, 2013, the disclosures of which are incorporated herein by reference.

TECHNICAL FIELD

The embodiments described herein pertain generally to an encoding apparatus and method for encoding a sound code, and a decoding apparatus and method for decoding the sound code.

BACKGROUND

As computer, electronic and communication technologies are rapidly developed, various wireless communication services using wireless networks have been provided. Accordingly, there is a tendency for services provided in mobile communication systems using wireless networks to develop into multimedia communication services for transmitting circuit data, packet data and others, in addition to voice services. In general, mobile communication devices, which include mobile phones, smart phones, PDAs and so on, are capable of conducting voice and data communication through mobile communication networks.

In addition, mobile communication devices provided with a short-distance communication module like an infrared sensor (IrDa) or Bluetooth are capable of transmitting and receiving specific data (images and/or audio) between the mobile communication devices without using mobile communication networks.

Recently, there has been an attempt to use sound as a communication means. In this regard, Korean Patent Application Publication No. 2007-0035552 describes providing a coupon or an authentication code to a wireless terminal by using sound data.

SUMMARY

In view of the foregoing, example embodiments provide a sound encoding apparatus and method, and a decoding apparatus and method, which are capable of providing various information representations within a limited frequency band. Example embodiments improve a recognition rate for a sound code in a long-distance environment. Example embodiments provide a sound code encoding apparatus and method, and a decoding apparatus and method to resolve troubles resulting from reverberant sound in an indoor environment. Example embodiments provide a sound code encoding apparatus and method, and a decoding apparatus and method, which are capable of simultaneously performing voice recognition and sound code recognition. Example embodiments provide a decoding apparatus and method, which are capable of identifying a position of an encoding apparatus by using a sound code output from the encoding apparatus. However, the problems sought to be solved by the present disclosure are not limited to the above description, and other problems can be clearly understood by those skilled in the art from the following description.

In one example embodiment, a decoding apparatus for generating information by decoding a sound code, the decoding apparatus includes a sound code input unit that receives a sound code output from an encoding apparatus through a sound wave reception device; a frame division unit that divides the sound code depending on a predetermined time interval to generate a plurality of frames; a frequency identification unit that identifies a frequency corresponding to each of the plurality of the frames through frequency analysis for each of the plurality of the frames; and an information generation unit that determines a frequency band, to which each of the identified frequencies corresponds, from an audible sound wave frequency band and a non-audible sound wave frequency band, and a plurality of partial information based on the frequency band and each of the identified frequencies, and generates information corresponding to the sound code based on the plurality of the partial information.

In another example embodiment, a method for generating information by decoding a sound code, the method includes receiving a sound code output from an encoding apparatus through a sound wave reception unit; dividing the sound code depending on a predetermined time interval to generate a plurality of frames; identifying a frequency corresponding to each of the plurality of the frames through frequency analysis for each of the plurality of the frames; determining a frequency band, to which each of the identified frequencies corresponds, from an audible sound wave frequency band and a non-audible sound wave frequency band, and a plurality of partial information based on the frequency band and each of the identified frequencies; and generating information corresponding to the sound code based on the plurality of the partial information.

In still another example embodiment, an encoding apparatus for encoding a sound code corresponding to information, the encoding apparatus includes a partial information generation unit that generates a plurality of partial information corresponding to the information;

a frequency determination unit that determines a frequency band corresponding to each of the plurality of the partial information from an audible sound wave frequency band and a non-audible sound wave frequency band, and a frequency corresponding to each of the plurality of the partial information within the determined frequency band; a sound signal generation unit that generates a plurality of sound signals corresponding to each of the plurality of the frequencies; a sound code generation unit that generates the sound code corresponding to the information, by combining the plurality of the sound signals depending on a predetermined time interval; and an output unit that outputs the generated sound code through a sound wave output device.

In still another example embodiment, a method for encoding a sound code corresponding to information, the method includes generating a plurality of partial information corresponding to the information; determining a frequency band corresponding to each of the plurality of the partial information from an audible sound wave frequency band and a non-audible sound wave frequency band, and a frequency corresponding to each of the plurality of the partial information within the determined frequency band; generating a plurality of sound signals corresponding to each of the plurality of the frequencies; combining the plurality of the sound signals with one another depending on a predetermined time interval, to generate the sound code corresponding to the information; and outputting the generated sound code through the sound wave output device.

In accordance with the example embodiments, it is possible to provide a sound code encoding apparatus and method, and a decoding apparatus and method, which are capable of providing various information representations within a limited frequency band, by allocating a multiple number of frequency bands to single information. In addition, it is possible to improve a recognition rate for a sound code in a long-distance environment through a line spectrum emphasis technique. In addition, it is possible to provide a sound code encoding apparatus and method, and a decoding apparatus and method to resolve troubles resulting from a reverberant sound in an indoor environment.

In addition, it is possible to provide a sound code encoding apparatus and method, and a decoding apparatus and method, which are capable of simultaneously performing sound recognition and sound code (an audible sound wave frequency band or a non-audible sound wave frequency band) recognition. It is possible to provide a decoding apparatus and method, which are capable of identifying a position of an encoding apparatus by anticipating an azimuth of the encoding apparatus by means of a multiple number of sound wave reception devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 9 and FIG. 10a to FIG. 10e depict an example for operation of a position information generation unit 26 of FIG. 8.

FIG. 12 is an operation flow chart showing a sound code decoding method in accordance with an example embodiment.

DETAILED DESCRIPTION

Figure 1:
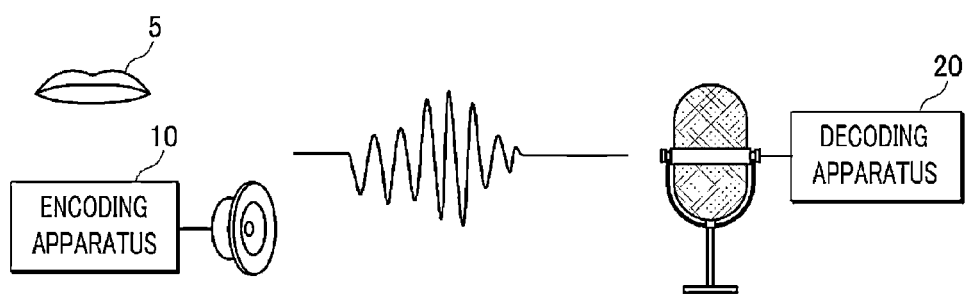
FIG. 1 is a configuration view of a sound code system of example embodiments.

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. In addition, the terms "comprises or includes" and "comprising or including" used in this document mean that other components may be further included, and not that other components are excluded, unless otherwise described herein, and should be construed as meaning that the possibility of presence or addition of other characteristics, numerals, steps, operations, components, parts or combinations thereof is not preliminarily excluded.

Throughout the whole document, the term "unit" includes a unit realized by hardware, a unit realized by software, and a unit realized by both hardware and software. In addition, one unit may be realized by using two (2) or more hardware systems, and two (2) or more units may be realized by one hardware system.

Throughout the whole document, part of operation or functions that are described to be performed by a terminal or a device may be performed by a server connected to the corresponding terminal or device. Likewise, part of operation or functions that are described to be performed by a server may also be performed by a terminal or device connected to the corresponding server.

Example embodiments described hereinafter are detailed descriptions of the present disclosure to facilitate understanding of the present disclosure and are not intended to limit the scope of the present disclosure. Thus, a subject matter having the same scope and performing the same function as those of the present disclosure also fall within the protection scope of the present disclosure.

FIG. 1 is a configuration view of a sound code system in accordance with an example embodiment. With reference to FIG. 1, the sound code system includes an encoding apparatus 10 and a decoding apparatus 20. However, since the sound code system of FIG. 1 is merely an example embodiment of the present disclosure, the present disclosure is not construed narrowly by FIG. 1, and various applications based on FIG. 1 may be possible. For example, in accordance with one of various example embodiments of the present disclosure, the sound code system may further include a control server that controls operation of the encoding or decoding apparatus. In addition, in accordance with one of various example embodiments of the present disclosure, the sound code system may also consider voice of a user 5, in addition to the encoding apparatus 10 and the decoding apparatus 20.

The encoding apparatus 10 generates a sound code. Specifically, the encoding apparatus 10 generates a sound code corresponding to information, by generating a multiple number of partial information corresponding to information, determining a frequency band corresponding to each of the multiple number of the generated partial information from an audible sound wave frequency band and a non-audible sound wave frequency band, determining a frequency corresponding to each of the multiple number of the generated partial information within the determined frequency band, generating a multiple number of sound signals corresponding to the multiple number of the determined frequencies, and combining the multiple number of the generated sound signals with one another depending on a preset time interval. In this case, the sound code may be represented by a sound QR code and generated based on frequencies within an audible sound wave frequency band or frequencies within a non-audible sound wave frequency band. For example, the audible sound wave frequency band may range from 100 Hz or more to 8000 Hz or less, and the non-audible sound wave frequency band may range from 15000 Hz or more to 24000 Hz or less.

The encoding device 10 outputs the generated sound code through a sound wave output device. In this case, an example for the sound wave output device is a speaker device, but not limited thereto. In addition, the output sound code is input into the decoding apparatus 20.

The encoding apparatus 10 may determine two (2) or more frequencies corresponding to single information (or partial information), and generate a single sound signal corresponding to the two (2) or more frequencies. Accordingly, the encoding apparatus 10 is capable of providing more various information representations.

When identical information (or particle information) continues, the encoding apparatus 10 may determine different frequencies corresponding to the two (2) or more respective continued partial information. Accordingly, the encoding apparatus 10 is capable of eliminating noise and errors resulting from a reverberant component generated when an identical frequency continues. In general, a frequency means a center frequency, but may mean a specific range of a frequency band. For example, the frequency may be 15000 Hz or a frequency band ranging from 15000 Hz to 15200 Hz.

The encoding apparatus 10 may combine sound and the sound code with each other, and output the combined sound wave. In this case, the sound may mean noise and echo of an object, and such sound may mean noise (or sound) of an audible sound wave frequency band. An example for the sound may be voice or music, but not limited thereto. Accordingly, the encoding apparatus 10 is capable of transmitting more various types of information, and furthermore, improving stability and efficiency of the transmission.

The encoding apparatus 10 may further include a separate communication module. The encoding apparatus 10 may transmit additional information associated with the sound wave to the decoding apparatus 20, by using the communication module through a network. In this case, the network means a connection structure capable of enabling information exchange between nodes such as terminals and servers, and examples for the network include a 3GPP (3rd Generation Partnership Project) network, a long term evolution (LTE) network, a world interoperability for microwave access (WIMAX) network, the Internet, a local area network (LAN), a wireless local area network (Wireless LAN), a wide area network (WAN), a personal area network (PAN), a Bluetooth network, a satellite broadcasting network, an analogue broadcasting network, and a digital multimedia broadcasting (DMB), but not limited thereto.

The decoding apparatus 20 decodes the sound code to generate information. Specifically, the decoding apparatus 20 receives the sound code output from the encoding apparatus through a sound wave reception device, divides the sound code depending on a preset time interval to generate a multiple number of frames, identifies a frequency corresponding to each of the multiple number of the frames through frequency analysis for each of the multiple number of the frames, determines a frequency band, to which each of the identified frequencies corresponds, from an audible sound wave frequency band and a non-audible sound wave frequency band, and a multiple number of partial information based on each of the identified frequencies, and generates information corresponding to the sound code based on the multiple number of the partial information. In this case, an example for the partial information is at least one of characters, numerals and signs. In addition, the characters may be a broad concept including numerals and signs.

The decoding apparatus 20 may identify two (2) or more frequencies corresponding to one frame, and determine one partial information based on the identified two (2) or more frequencies. Accordingly, it is possible to deliver more various types of information between the encoding apparatus 10 and the decoding apparatus 20.

The decoding apparatus 20 may identify a frequency based on an energy value corresponding to each of the multiple number of the frames. For example, the decoding apparatus 20 may more easily identify a frequency, by squaring an energy value corresponding to each of the multiple number of the frames.

When a frequency of a first frame and a frequency of a second frame among the multiple number of the frames input into the decoding apparatus 20 are different from each other, partial information of the first frame and partial information of the second frame may be identically interpreted. To this end, as described above, when identical partial information continues, the encoding apparatus 10 may determine different frequencies corresponding to the two (2) or more respective continued partial information. Accordingly, noise and errors resulting from a reverberant component generated when an identical frequency band continues can be eliminated.

The decoding apparatus 20 may perform sound recognition for sound or voice of the user 5 that has been received through the sound wave reception device, and generate information based on the sound recognition for the sound and decoding of the sound code. In this case, the sound may mean noise or echo of an object, and such sound may mean noise (or sound) of an audible sound wave frequency band. An example for the sound is voice or music, but not limited thereto. In addition, if the sound is voice, the sound recognition means voice recognition. In addition, for convenience in descriptions to be provided hereinafter, the sound is assumed to mean voice, but not limited thereto. Additionally, the sound code may be generated based on frequencies within an audible sound wave frequency band or frequencies within a non-audible sound wave frequency band. That is, according to an example embodiment, the decoding apparatus 20 may perform both voice recognition for the voice of the user 5, which corresponds to an audible sound wave frequency band, and decoding of the sound code, which corresponds to an audible sound wave frequency band or a non-audible sound wave frequency band.

Accordingly, information in more various combinations can be transmitted between the encoding apparatus 10 and the decoding apparatus 20, and furthermore, stability and efficiency of the transmission can be improved.

The decoding apparatus 20 may identify a position of the encoding apparatus 10 by using the sound code, and perform operation corresponding to the position of the encoding apparatus 10 or operation to be directed toward the position of the encoding apparatus 10 based on position information of the encoding apparatus 10. For example, the decoding apparatus 20 may move itself or home appliances including the decoding apparatus 20 toward the direction of the position of the encoding apparatus 10. In this case, an example for the home appliances may be a cleaner equipped with a power device. For another example, the decoding apparatus 20 may rotate itself or home appliances including the decoding apparatus 20 toward the direction of the position of the encoding apparatus 10. In this case, an example for the home appliances may be a fan or an air conditioner.

Examples for the encoding apparatus 10 and the decoding apparatus 20 may be mobile devices or embedded devices included in mobile devices. Here, the mobile devices are mobile communication devices assuring portability and mobility and may include, for example, any types of hand-held-based wireless communication devices such as personal communication systems (PCSs), global systems for mobile communication (GSM), personal digital cellulars (PDCs), personal handyphone systems (PHSs), personal digital assistants (PDAs), international mobile telecommunication (IMT)-2000, code division multiple access (CDMA)-2000, W-code division multiple access (W-CDMA), wireless broadband Internet (WiBro) terminals and smart phones, smart pads, tablet PCs and so on.

Other examples for the encoding apparatus 10 and the decoding apparatus 20 may be smart home appliances or embedded devices included in smart appliances. In general, the smart home appliances are home appliances, which can be controlled to automatically accomplish their optimum performance, and may be a refrigerator, a washing machine, an air conditioner, an oven, a microwave, a cleaner, a fan and so on, but are not limited thereto.

Hereinafter, the operation of the encoding apparatus 10 and the operation of the decoding apparatus 20 are described more in detail by using the drawings.

Figure 2:
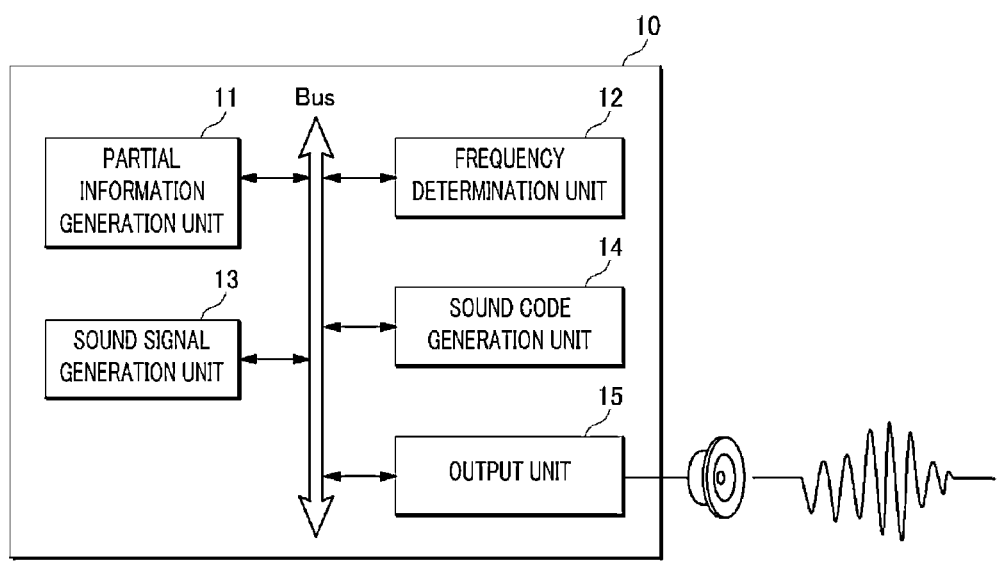
FIG. 2 is a configuration view of an encoding apparatus in accordance with an example embodiment.

FIG. 2 is a configuration view of an encoding apparatus in accordance with an example embodiment. With reference to FIG. 2, the encoding apparatus 10 includes a partial information generation unit 11, a frequency determination unit 12, a sound signal generation unit 13, a sound code generation unit 14 and an output unit 15. However, the encoding apparatus 10 illustrated in FIG. 2 is merely an example embodiment of the present disclosure, and various modifications based on the components illustrated in FIG. 2 are possible. For example, the encoding apparatus 10 may further include at least one of a user interface that receives input of information from a user, a display, a sound wave output device and a sound wave reception device.

The partial information generation unit 11 generates a multiple number of partial information corresponding to information. In this case, an example for the partial information is at least one of characters such as "¬" and "a," numerals such as "1" and "2," and signs. In addition, the characters may be a broad concept including numerals and signs.

The frequency determination unit 12 determines a frequency corresponding to each of the multiple number of the partial information. For example, the frequency determination unit 12 may divide a total bandwidth of 5000 Hz between 15000 Hz and 20000 Hz for a non-audible sound wave frequency band by a unit of at least 200 Hz, so as to discriminate twenty-five (25) frequencies, and then, determine each of the 25 discriminated frequencies to be a frequency corresponding to each of 25 partial information. In addition, the frequency determination unit 12 may determine each of a multiple number of frequencies between 100 Hz or more and 8000 Hz for an audible sound wave frequency band to be a frequency corresponding to each of the multiple number of the partial information.

Figure 3:
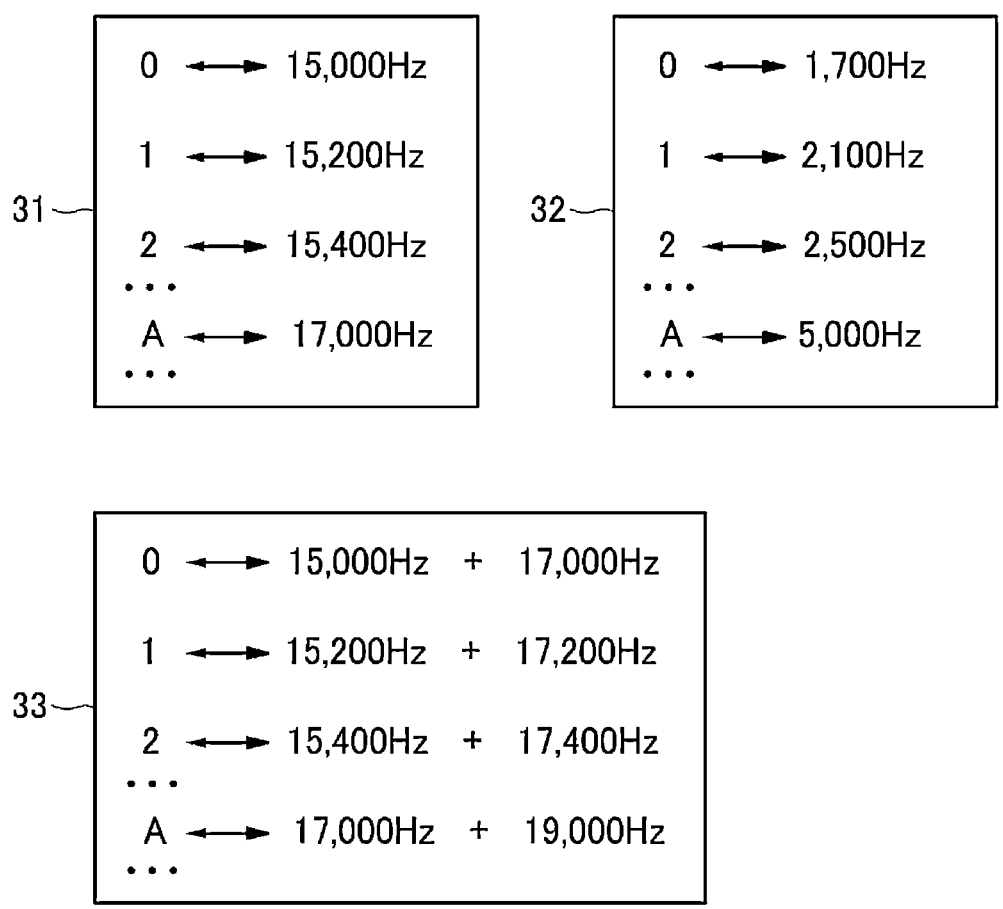
FIG. 3 depicts an example for mapping a frequency to partial information.

FIG. 3 depicts an example for mapping a frequency to partial information. To describe an example with reference to the reference numeral 31 in FIG. 3 (using a non-audible sound wave frequency band), the frequency determination unit 12 may map partial information "0" to the frequency of 15000 Hz, partial information "1" to the frequency of 15200 Hz, partial information "2" to the frequency of 15400 Hz, and partial information "A" to the frequency of 17000 Hz. In accordance with an example embodiment, the frequency determination unit 12 may map a frequency band to each of the partial information. For example, the frequency determination unit 12 may map the partial information "0" to the frequency ranging from 15000 Hz to 15200 Hz, the partial information "1" to the frequency ranging from 15200 Hz to 15400 Hz, the partial information "2" to the frequency ranging from 15400 Hz to 15600 Hz, and the partial information "A" to the frequency ranging from 17000 Hz to 17200 Hz.

In addition, to describe an example with reference to the reference numeral 32 in FIG. 3 (using an audible sound wave frequency band), the frequency determination unit 12 may map the partial information "0" to the frequency of 1700 Hz, the partial information "1" to the frequency of 2100 Hz, the partial information "2" to the frequency of 2500 Hz, and the partial information "A" to the frequency of 5000 Hz. As described above, identical partial information may be mapped to different frequencies depending on which frequency band is used.

This frequency mapping information is a type of a code book and may be stored in the encoding apparatus 10 and the decoding apparatus 20.

The sound signal generation unit 13 generates a multiple number of sound signals corresponding to the multiple number of the frequencies, respectively. For example, the sound signal generation unit 13 may generate a first sound signal corresponding to a first frequency, and a second sound signal corresponding to a second frequency.

The sound signal generation unit 13 may generate, as sound signals, sinusoidal sound wave signals, which have a frequency as a center (or basic) or carrier frequency. For example, the sound signal generation unit 13 may generate sinusoidal sound wave signals having a frequency of 15000 Hz as their basic frequencies. In accordance with an example embodiment, the sinusoidal sound wave signals are discrete signal samples, and the sound signal generation unit 13 may generate analogue sound signals corresponding to the sinusoidal sound wave signals by using the codec.

The sound code generation unit 14 generates a sound code by using the multiple number of the sound signals. Specifically, the sound code generation unit 14 may generate a sound code corresponding to information, by combining or arranging the multiple number of the sound signals depending on a time interval. In this case, the sound signals combined or arranged depending on a time interval may be configured as the respective frames of the sound code.

The sound code may include a header, a body and a tail. In this case, the body may include the multiple number of the sound signals, the header may include an additional sound signal (or an additional sound code) corresponding to additional information such as identification information of the encoding apparatus and identification information of the decoding apparatus, and the tail may include an error correction sound signal (or an error correction sound code) corresponding to an error correction code like cyclic redundancy check (CRC).

The output unit 15 outputs the generated sound code through a sound wave output device. In this case, an example for the sound wave output device is a speaker device.

In accordance with an example embodiment, the frequency determination unit 12 may determine first and second frequencies corresponding to first partial information, and the sound signal generation unit 13 may generate first sound signals corresponding to first and second frequency bands. Thus, the frequency determination unit 12 may allocate or map two (2) or more frequencies to one partial information, and the sound signal generation unit 13 may generate individual sound signals based on the two (2) or more frequencies.

Allocating two (2) frequencies per information enables more various information representations than conventionally allocating one frequency per information. For example, when 1024 point FFT is implemented at 48000 Hz, in case of an amount of information that can be used in a non-audible band of from 15000 Hz to 20000 Hz, only twenty-five (25) information representations, which are obtained by dividing 5000 Hz by 200, are possible, whereas in case of performing encoding by allocating two (2) frequencies per information, 600 information representations, which are obtained by multiplying 25 and 24, are possible in theory. In this case, even if closely related frequencies are excluded in consideration of discrimination of frequencies, at least 500 stable information representations, which are obtained by multiplying 25 and 20, are possible. In this case, generating one sound signal or code corresponding to one frequency is referred-to as a pure-tone encoding technique, and generating one sound signal or code corresponding to two (2) or more frequencies is referred-to as a multi-tone encoding technique.

To describe an example for the multi-tone encoding technique with reference to the reference numeral 33 in FIG. 3, the frequency determination unit 12 allocates or maps both a first frequency of 15000 Hz and a second frequency of 17000 Hz to first partial information "0." Thereafter, the sound signal generation unit 13 generates a first sinusoidal sound wave signal having the first frequency of 15000 Hz as a basic frequency, generates a second sinusoidal sound wave signal having the second frequency of 17000 Hz as a basic frequency, and adds the first and second sinusoidal sound wave signals to each other, so as to generate a first sound signal.

In accordance with an example embodiment, the first and second sinusoidal sound wave signals are discrete signal samples, and the sound signal generation unit 13 may generate a first analogue sound signal corresponding to the first sinusoidal sound wave signal and a second analogue sound signal corresponding to the second sinusoidal sound wave signal by using the codec, and add the first and second analogue sound signals to each other, so as to generate a first sound signal.

The sound code generation unit 14 may store a series of sound signals generated by partial information (e.g., characters, numerals, signs and symbols) in a buffer, and then, add the header and the tail thereto so as to complete the sound code.

In accordance with an example embodiment, the frequency determination unit 12 may determine different frequencies for the first and second partial information, which are identical to each other in content. For example, when an identical character continues, like the case where first partial information is "1," and second partial information is "1," the frequency determination unit 12 may determine a frequency of the first partial information to be 15000 Hz, and a frequency of the second partial information to be 19000 Hz.

In general, various reverberations may exist depending on an interior structure in an indoor recognition environment. As a frequency component by such reverberations significantly affects a frequency component of a next signal sequence (or partial information), it may be a cause for occurrence of errors at the decoding time. Especially, when identical partial information continues, a reverberant component has a great effect on next partial information. As a solution to the problem, when identical partial information continues, the frequency determination unit 13 may determine a frequency band of the second partial information to be a preset specific frequency, and thereby, reducing errors resulting from the reverberant component.

Figure 4:
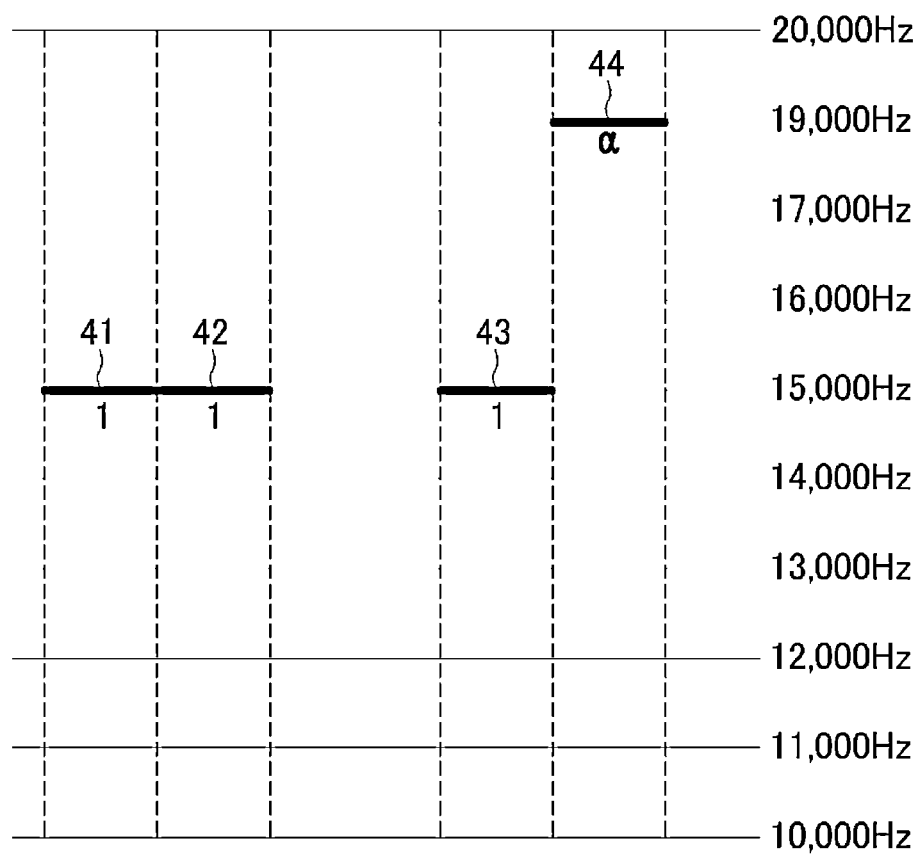
FIG. 4 depicts an example for determining a frequency corresponding to partial information.

FIG. 4 depicts an example for determining frequencies corresponding to partial information. With reference to FIG. 4, if the frequency determination unit 13 determines both the frequency of the first partial information and the frequency of the second partial information 41, 42 to be 15000 Hz corresponding to the partial information "1" to generate a sound code corresponding to "11," noise or errors due to a reverberant component may occur. However, if the frequency determination unit 13 determines the frequency 43 of the first partial information to be 15000 Hz corresponding to the partial information "1," and the frequency 44 of the second partial information to be 19000 Hz corresponding to the partial information "α," noise or errors due to a reverberant component can be significantly reduced. In this case, "α" may be preset partial information, which is used when continued partial information like "1" and "1," "2" and "2," and "A" and "A" occurs.

Figure 5:
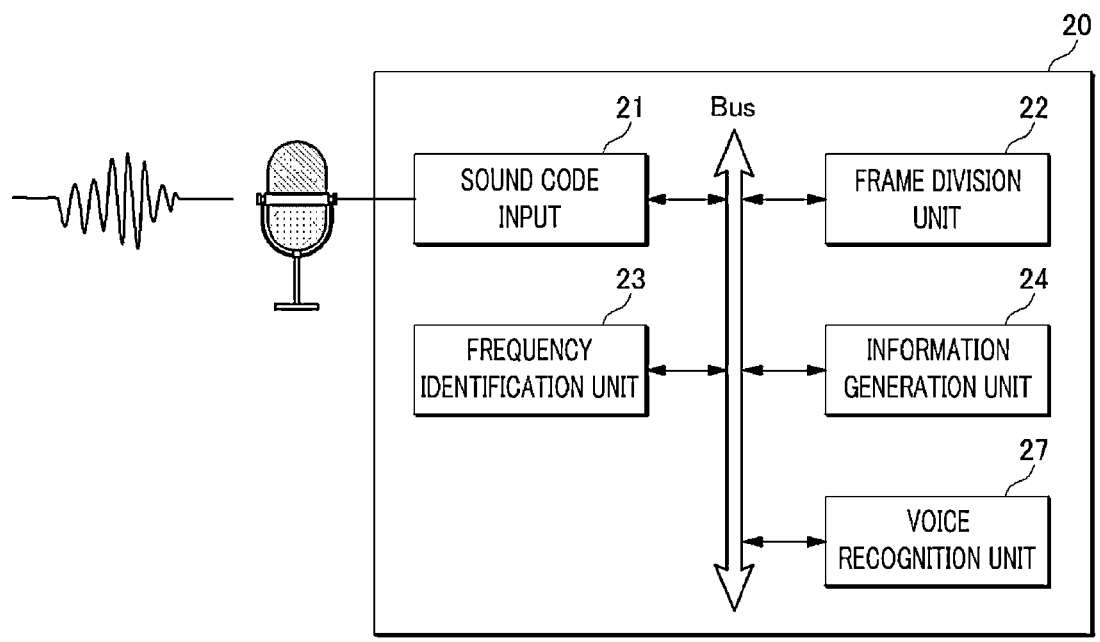
FIG. 5 is a configuration view of a decoding apparatus in accordance with an example embodiment.

FIG. 5 is a configuration view of a decoding apparatus in accordance with an example embodiment. With reference to FIG. 5, the decoding apparatus 10 includes a sound code input unit 21, a frame division unit 22, a frequency identification unit 23, an information generation unit 24 and a voice recognition unit 27. However, the decoding apparatus 20 illustrated in FIG. 5 is merely an example embodiment of the present disclosure, and various modifications based on the components illustrated in FIG. 5 are possible. For example, the decoding apparatus 20 may further include at least one of user interface that receives information from a user, a display, a sound wave output device and a sound wave reception device.

The sound code input unit 21 receives the sound code output from the encoding apparatus 10 through the sound wave reception device. In this case, the sound code may be represented by a sound QR code and means one obtained by encoding information in a sound wave form. In addition, an example for the sound wave reception unit is a microphone, but not limited thereto.

The frame division unit 22 divides the sound code depending on a preset time interval to generate a multiple number of frames. For example, the frame division unit 22 divides the sound code into a multiple number of frames depending on a one-second time interval. In this case, if the sound code is a sound wave lasting for 10 seconds, it may be divided into 10 frames.

The frequency identification unit 23 identifies a frequency corresponding to each of the multiple number of the frames through frequency analysis for each of the multiple number of the frames. In this case, each of the multiple number of the frames includes a sound signal having a preset frequency, and the frequency corresponding to each of the multiple number of the frames may mean the frequency of the sound signal. In general, the multiple number of the frequencies may be selected within a range of from 15000 Hz or more to 24000 Hz or less, an interval of the multiple number of the frequencies may be at least 200 Hz, and the sound code may be a sound wave having a non-audible frequency. Or, the multiple number of the frequencies may be selected within a range of from 100 Hz or more to 8000 Hz or less, and the sound code may be a sound wave having an audible frequency. In addition, the frequency identification unit 23 may identify a frequency by analyzing a frequency peak for each of the multiple number of the frames.

The frequency identification unit 23 may identify, for example, 15000 Hz, which is a frequency of a sound signal included in a first frame among the multiple number of the frames, and 17000 Hz, which is a frequency of a sound signal included in a second frame. In this regard, the encoding apparatus 10 may divide a total bandwidth of 5000 Hz between 15000 Hz to 20000 Hz for a non-audible sound wave band frequency by a unit of 200 Hz, so as to discriminate 25 frequencies, determine the discriminated 25 frequencies to be frequencies corresponding to 25 partial information, respectively, and generate sound signals corresponding to the determined frequencies to arrange the sound signals in the respective frames of the sound code.

The frequency identification unit 23 identifies a frequency through frequency analysis. To this end, the frequency identification unit 23 may identify a frequency by using a frequency conversion technique and an inverse frequency conversion technique for the analogue sound codes, the multiple number of the frames, or the sound signals of the multiple number of the respective frames. An example for the frequency conversion technique is fast fourier transform (FFT), and an example for the inverse frequency conversion technique is inverse fast fourier transform (IFFT).

The sound signals may be sinusoidal sound wave signals having a preset frequency as their center (or basic) or carrier frequencies. For example, a first sound signal is a sinusoidal sound wave signal having a frequency of 15000 Hz as a basic frequency. In accordance with an example embodiment, the sinusoidal sound wave signals are discrete signal samples, and the sound signals may be analogue sound signals transformed from the sinusoidal sound wave signals through the codec.

The data generation unit 24 generates a multiple number of partial information corresponding to the identified frequencies, respectively. In this case, an example for the partial information is at least one of characters such as "ㄱ" and "a," numerals such as "1" and "2," and signs. In addition, the characters may be a broad concept including numerals and signs.

For example, if the sound code consists of three (3) frames, a frequency of a first frame is 15000 Hz, a frequency of a second frame is 15200 Hz, and a frequency of a third frame is 17000 Hz, the data generation unit 24 generates partial information "0" corresponding to 15000 Hz, partial information "1" corresponding to 15200 Hz, and partial information "A" corresponding to 17000 Hz.

The information generation unit 24 generates information corresponding to the sound code based on the multiple number of the partial information. For example, when the partial information of the first frame is "0," the partial information of the second frame is "1," and the partial information of the third frame is "A," the information generation unit 24 may combine the partial information with one another to decode or generate "01A," which is information corresponding to the sound code. Other examples in this regard are identical or similar to those described above with reference to FIG. 3.

The sound code may include a header, a body and a tail. In this case, the body may include the multiple number of the sound signals, the header may include an additional sound signal (or an additional sound code) corresponding to additional information such as identification information of the encoding apparatus and identification information of the decoding apparatus, and the tail may include an error correction sound signal (or an error correction sound code) corresponding to an error correction code like cyclic redundancy check (CRC). The data generation unit 24 may decode or generate information or partial information based on the header, the body and the tail included in the sound code.

In accordance with an example embodiment, the frequency identification unit 23 may identify first and second frequencies from the first frame, and the information generation unit 24 may generate first partial information based on the first and second frequencies. Thus, the frequency identification unit 23 may identify two (2) or more frequencies from one frame, and the information generation unit 24 may generate one partial information corresponding to the two (2) or more frequencies.

As described above, allocating two (2) frequencies per information enables more various information representations than conventionally allocating one frequency per information. For example, when frequency allocation per information representation is 200 Hz to facilitate classification at the decoding time, in case of an amount of information that can be used in an audible band of from 15000 Hz to 20000 Hz, only twenty-five (25) information representations, which are obtained by dividing 5000 Hz by 200, are possible, whereas in case of performing encoding by allocating two (2) frequencies per information, 600 information representations, which are obtained by multiplying 25 and 24, are possible in theory. In this case, even if closely related frequencies are excluded in consideration of discrimination of frequencies, at least 500 stable information representations, which are obtained by multiplying 25 and 20, are possible. In this case, identifying one frequency from one frame is referred-to as a pure-tone decoding technique, and identifying two (2) or ore frequencies from one frame is referred-to as a multi-tone decoding technique.

To describe an example for the multi-tone decoding technique with reference to the reference numeral 33 in FIG. 3, the frequency identification unit 23 may identify a first frequency of 15000 Hz and a second frequency of 17000 Hz from the first frame, and the information generation unit 24 may generate first partial information "0" based on the first and second frequencies. In this case, a sound signal of the first frame may be formed of a combination of first and second analogue sound signals, the first analogue sound signal may be one transformed from a first sinusoidal sound wave signal having the first frequency as a center frequency through the codec, and the second analogue sound signal may be one transformed from a second sinusoidal sound wave signal having the second frequency as a center frequency.

In accordance with an example embodiment, the frequency identification unit 23 may identify a frequency based on an energy value corresponding to each of the multiple number of the frames. In general, when a sound wave is output at a close distance within 1 m, a frequency spectra scope of the sound wave received in the decoding apparatus 20 has a sharp shape. That is, as a signal to noise ratio (SNR) of the received sound wave is excellent, the recognition rate of the decoding apparatus 20 is high. However, when a sound wave is output in a long distance of 5 m or more, the SNR of the received sound wave is decreased, so that the decoding apparatus 20 cannot easily perform the recognition. As a solution to the problem, recognition performance in a long distance environment can be improved by performing feature parameter extraction using linearity of a spectra scope of a sinusoidal tone of the sound wave. An example for the feature parameter extraction may improve the recognition performance by squaring an energy value of the received sound wave by the multiple number of the frames.

For example, when a spectrum log energy value of a certain frequency desired to be recognized is 10, and a spectrum log energy value of noise is 5, the SNR is 5 dB, which is obtained by deducting 5 from 10. However, if the frequency identification unit 23 squares the energy value of the sound wave by frames, the SNR in a specific frame becomes 10 dB(10=(10+10)−(5+5)). The increase of the SNR from 5 dB to 10 dB means that an identification rate of the sound signal or code has increased, compared to noise.

In accordance with an example embodiment, the information generation unit 24 may identically interpret partial information of the frequency of the first frame and partial information of the frequency of the second frame, even when the frequency of the first frame and the frequency of the second frame are different from each other.

In general, various reverberations may exist depending on an interior structure in an indoor recognition environment. As a frequency component by such reverberations significantly affects a frequency component of a next signal sequence (or partial information), it may be a cause for occurrence of errors at the decoding time. Especially, when identical partial information continues, a reverberant component seriously affects the next partial information. As a solution to the problem, when identical partial information continues, the encoding apparatus 10 and the decoding apparatus 20 may determine a frequency band of the second partial information to be a preset specific frequency, and thereby, reducing errors resulting from the reverberant component.

To describe an example with reference to FIG. 4, if the frequency 43 of the first frame is identified as 15000 Hz, and the frequency 44 of the second frame is identified as 19000 Hz, even though the frequency of the second frame corresponds to partial data "α," the information generation unit 24 does not interpret the frequency of the second frame as "α," and may interpret the frequency of the second frame as partial information "1" corresponding to the frequency of 15000 Hz of the first frame. Finally, the information generation unit 24 may determine information consisting of the first and second frames to be "11." In this case, "α" may be preset partial information, which is used when continued partial information such as "1" and "1," "2" and "2," and "A" and "A" occurs.

In accordance with an example embodiment, information may be generated even in consideration of voice recognition. The voice recognition unit 27 performs voice recognition for voice of a user received through the sound wave reception device, and the sound code input unit 21 receives the sound code output from the encoding apparatus 10. The information generation unit 24 may generate information based on the voice recognition and the recognition of the sound code. In this case, the frequency of the sound code corresponding to the audible sound wave frequency band and the frequency of the voice corresponding to the audible sound wave frequency band may be selected within a range of from 100 Hz or more to 8000 Hz or less, and the frequency of the sound code corresponding to the non-audible sound wave frequency band may be selected within a range of from 15000 Hz or more to 24000 Hz or less.

The information generation unit 24 may recognize the voice through the voice recognition to generate first information corresponding to the voice, generate second information corresponding to the sound code, and generate information by using the first and second information. For example, the information generation unit 24 may generate information by decoding the second information by using the first information, or combining the first and second information with each other.

It is possible to mutually combine, recognize and operate the voice corresponding to the audible sound wave frequency band and the sound code corresponding to the audible or non-audible sound wave frequency band, through identical hardware (e.g., the decoding apparatus) while minimizing mutual interference. A user receives more various human machine interface (HMI) through the combination of the voice and the sound code.

Figure 6:
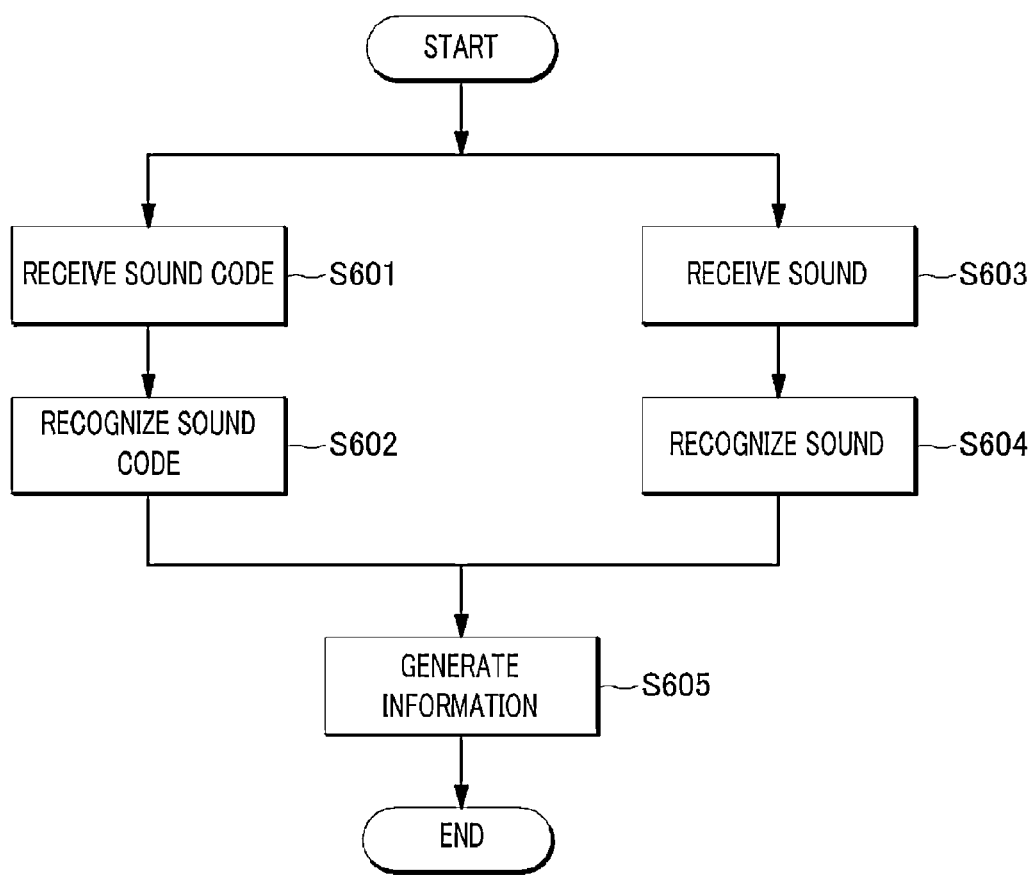
FIG. 6 depicts an example for operation of a decoding apparatus of example embodiments.

FIG. 6 depicts an example for operation of the decoding apparatus of example embodiments. With reference to FIG. 6, in S601, the decoding apparatus 20 or the sound code input unit 21 may receive the sound code. In S602, the decoding apparatus 20 or the frame division unit 22 and the frequency identification unit 23 may recognize the sound code and identify the multiple number of the sound signals combined with one another within the sound code through decoding of the sound code.

In addition, in S603 and S604, the decoding apparatus 20 or the voice recognition unit 27 may recognize sound (or a sound file) received through the sound wave reception device. In this case, the sound may mean noise or echo of an object, and such sound may mean noise (or sound) of an audible sound wave frequency band. An example for the sound is voice or music, but not limited thereto.

In S605, the decoding apparatus 20 or the information generation unit 24 may generate information based on the recognized sound code and sound (voice).

In the descriptions above, S601 and S605 may be divided into additional steps according to example embodiments or combined with each other to be a narrower scope of steps. In addition, parts of the steps may be omitted according to necessity, and the sequence of the steps may be changed.

Figure 7:
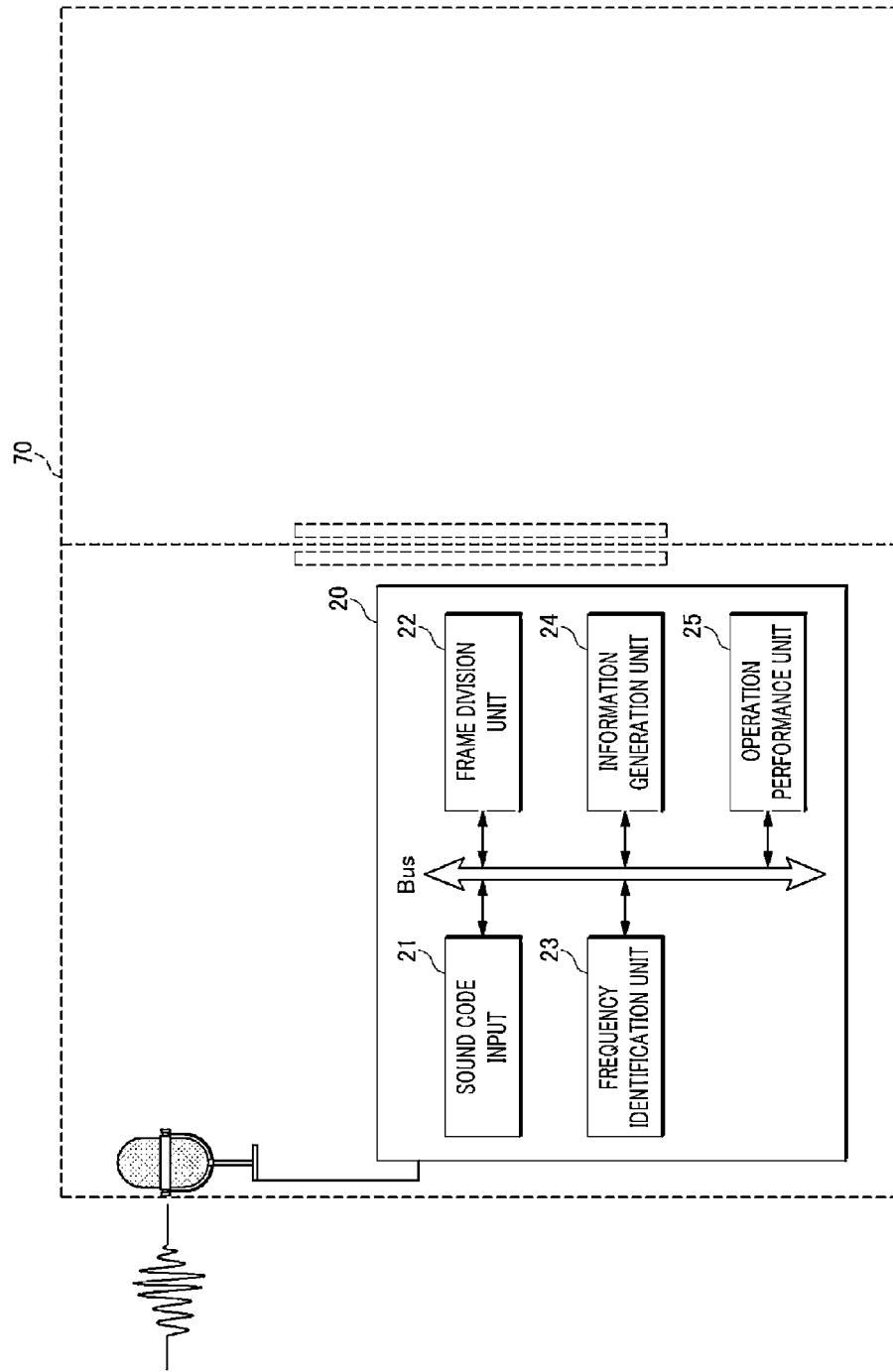
FIG. 7 depicts an example for operation of a decoding apparatus of example embodiments.

FIG. 7 depicts an example for operation of the decoding apparatus of example embodiments. With reference to FIG. 7, the decoding apparatus 20 may further include an operation performance unit 25. The operation performance unit 25 performs operation corresponding to generated information. In this case, the information may be control information.

For example, if the control information is control information to make the power of the decoding apparatus 20 or home appliances including the decoding apparatus On/Off, the operation performance unit 25 may make the power of the decoding apparatus 20 or the home appliances (e.g., a refrigerator, a washing machine, an air conditioner, a cleaner and so on) On/Off. As another example, if the control information is control information to move the decoding apparatus 20 or home appliances including the decoding apparatus, the operation performance unit 25 may move the decoding apparatus 20 or the home appliances. As another example, if the control information is control information to request status information for the decoding apparatus 20 or home appliances including the decoding apparatus, the operation performance unit 25 may generate status information corresponding to the decoding apparatus 20 or the home appliances, to transmit the information to the encoding apparatus 10 or a mobile device including the encoding apparatus. In this case, the operation performance unit 25 may generate a sound wave corresponding to the status information to output the sound wave toward the encoding apparatus 10 or the mobile device.

Figure 8:
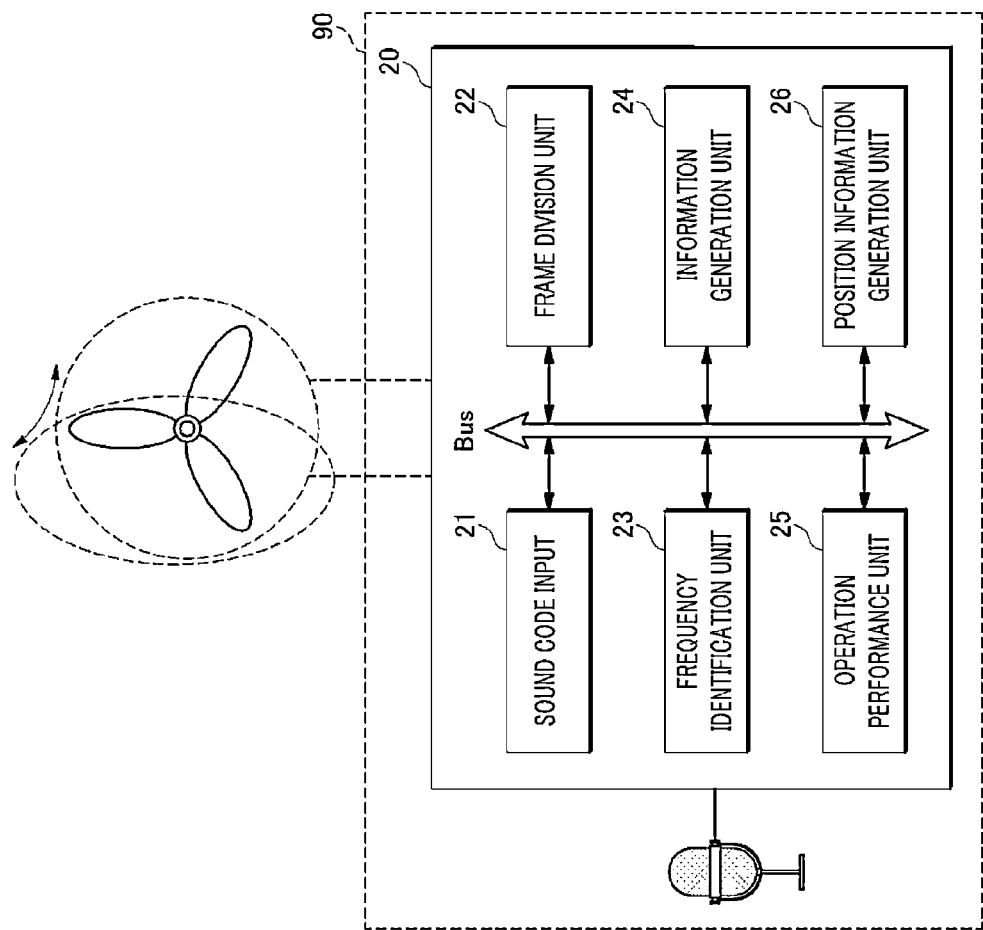
FIG. 8 depicts an example for operation of a decoding apparatus of example embodiments.
Figure 8:
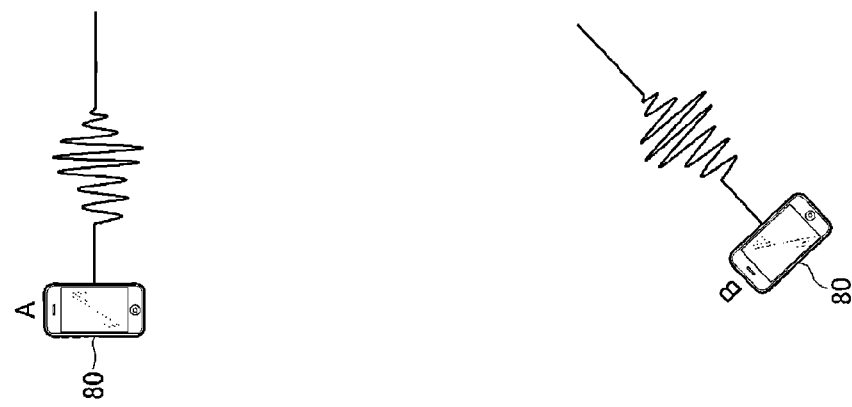
Figure 9:
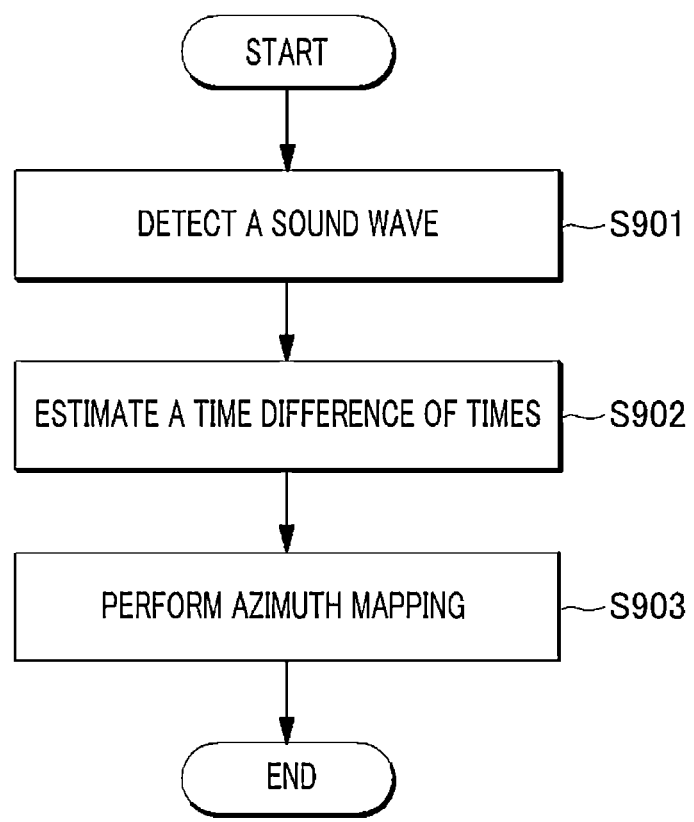

FIG. 8 depicts an example for operation of the decoding apparatus of example embodiments. With reference to FIG. 8, the decoding apparatus 20 may further include a position information generation unit 26.

The position information generation unit 26 generates position information for the encoding apparatus 10 or a mobile device 80 including the encoding apparatus by using a multiple number of sound wave reception devices. In this case, the operation performance unit 25 may perform the operation based on the generated position information. To describe an example with reference to FIG. 8, if position information of the encoding apparatus 10 or the mobile device 80 is A, the operation performance unit 25 may perform or control operation of a fan 90 including the decoding apparatus 20 such that the rotation direction of the decoding apparatus 20 or the fan 90 is directed toward A. On the other hand, if position information of the encoding apparatus 10 or the mobile device 80 is B, the operation performance unit 25 may perform or control operation of the fan 90 including the decoding apparatus 20 such that the rotation direction of the fan 90 is directed toward B. To this end, the operation performance unit 25 may control the power device included in the fan 90.

The position information generation unit 26 generates the position information by using a multiple number of sound wave reception devices. Specifically, the position information generation unit 26 may generate the position information based on a time interval when the sound code is input into each of the multiple number of the sound wave reception devices. In this case, the position information may be an azimuth between at least one of the multiple number of the sound wave reception devices and the decoding apparatus 20, and the encoding apparatus 10.

FIG. 9 and FIG. 10a to FIG. 10e depict an example for operation of the position information generation unit 26. Hereinafter, an example for operation of the position information generation unit 26 is described with reference to FIG. 9 and FIG. 10a to FIG. 10e.

The decoding apparatus 20, which is a module receiving a sound code within home appliances requiring directional control such as an air conditioner, a fan, a robot cleaner and others, implements sound wave communication with the encoding apparatus 10 or the mobile device 80 equipped with the encoding apparatus 10 in a short distance even without separate network means. In this case, the home appliances may dynamically perform the operation depending on change in the position of the encoding apparatus 10 or the mobile device 80. For example, an air condition or a fan may control the wind direction thereof toward a direction in which a user is located, by identifying a position of the mobile device 80. To this end, the information generation unit 26 included in the decoding apparatus needs to generate position information for the encoding apparatus 10 or the mobile device 80.

In S901, the position information generation unit 26 detects a sound wave, and if the detected sound wave is determined to be control information, the position information generation unit 26 determines the detected sound wave to be a sound wave, for which position information should be generated. Thereafter, the position information generation unit 26 overlaps each of the multiple number of the frames. For example, if each frame includes 1024 samples, the position information generation unit 26 may overlaps 512 samples with the other 512 frames of the frame.

In S902, the position information generation unit 26 estimates a time difference of times when a sound wave (or a sound code) is input into each of the multiple number of the sound wave reception devices. This may be referred-to as estimation of an inter-aural time difference (ITD).

The position information generation unit 26 traces a position of a sound source based on a time difference among three (3) sound wave reception devices (e.g., microphones), and if cross correlation calculated in a time domain is applied to a frequency domain, a calculation amount and calculation time can be significantly reduced, and the same outcome can be obtained. In order to obtain a time difference among three (3) sound wave reception devices through Math Formula 1, the position information generation unit 26 creates a pair (or a channel) of first and second microphones, a pair (or a channel) of second and third microphones, and a pair (or a channel) of third and first microphones, and calculates cross correlation among the pairs.

$$y(d) = IDFT\{DFT^*\{x_1(n)\}DFT\{x_2(n)\}\}$$

$$\text{estimated delay} = \arg\max\{y(d)\} \quad \text{[Math Formula 1]}$$

In this case, d means delay values between two sound waves, y(d) means a function presenting delay values between two sound waves, * means a complex conjugate, x1(n) means a sound wave input into the first microphone, and x2(n) means a sound wave input into the second microphone. In addition, an index value d of y(d), which has the highest value of the calculated values y(d), is regulated as a time difference (estimated delay) between two signals, and total three (3) values for a time difference corresponding to the three (3) pairs can be obtained.

In S903, the position information generation unit 26 performs azimuth mapping based on the time difference. First, with reference to FIG. 10a, the position information generation unit 26 calculates an incident angle of a sound wave based on a velocity of the sound wave and a time difference between two microphones through Math Formula 2.

$$\sin\theta = \frac{ct}{d} \quad \text{[Math Formula 2]}$$

$$\theta = \arcsin\left(\frac{c \cdot \text{delay samples} \cdot \text{sampling period}}{d}\right)$$

In this case, θ may mean an incident angle of the sound wave, c may mean a velocity of the sound wave, t may mean a time difference between the microphones, and d may mean a distance between the two microphones. The time difference means the estimated time difference obtained in S902, and since such a time difference indicates a difference in the number of samples, it may be presented in the form of multiplication of a sampling period and delay samples.

Figure 10A:
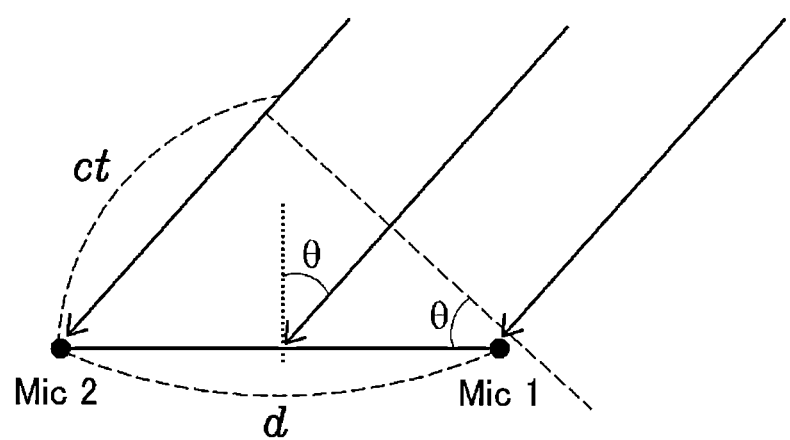
Figure 10B:
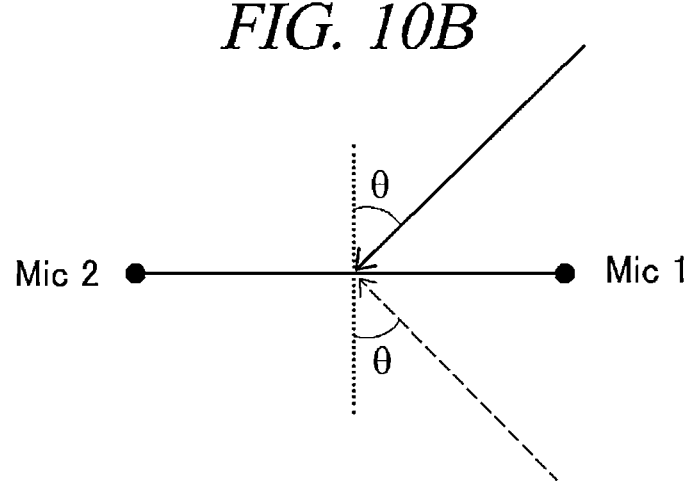

With reference to FIG. 10b, while there is one time difference between the two microphones, two (2) azimuths are obtained through azimuth transformation. This is because azimuths having an identical time difference are symmetrically present based on the line connecting the two microphones. Thus, an azimuth of the sound wave estimated for the three pairs of microphone have total six (6) candidates. The six (6) candidate azimuths are elected as the most reliable azimuth candidates of a specific frame.

Figure 10C:
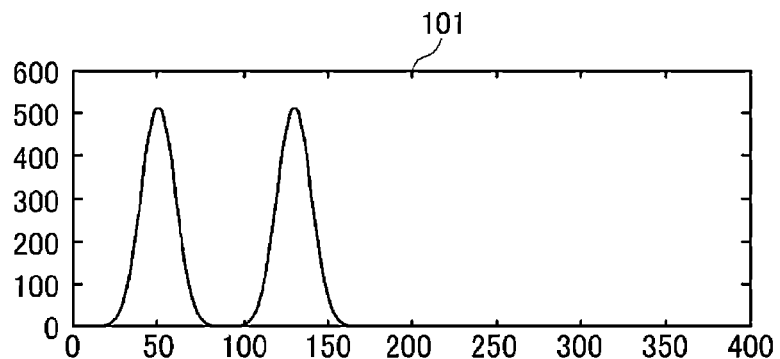
Figure 10C:
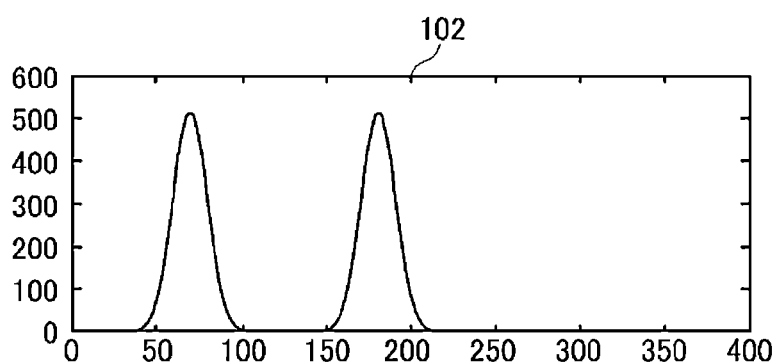
Figure 10C:
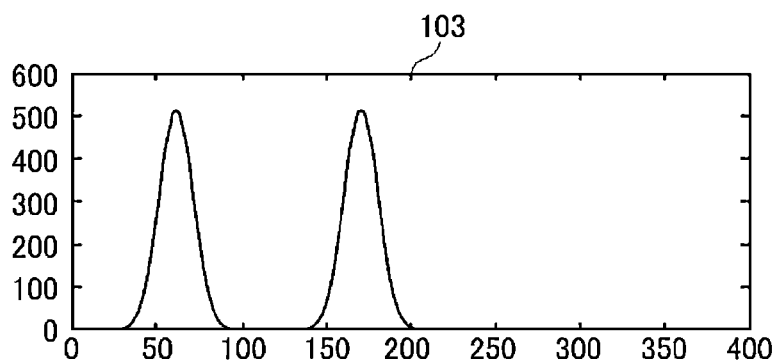
Figure 10C:
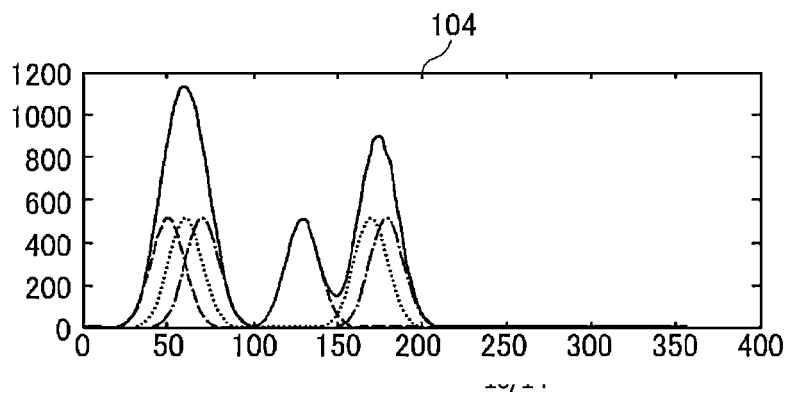
Figure 10E:
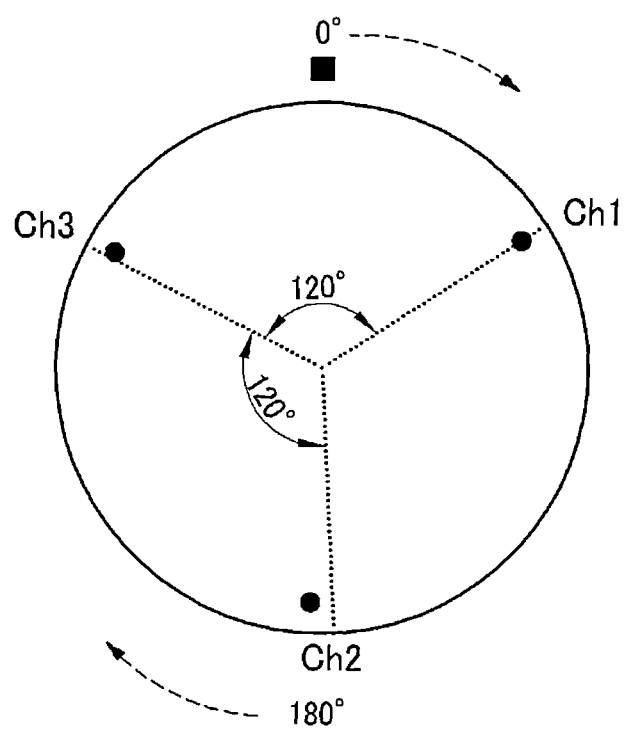

With reference to FIG. 10c, the position information generation unit 26 may generate an azimuth-Gaussian histogram. Specifically, if three (3) estimated delay values are delay 1, delay 2 and delay 3, the position information generation unit 26 calculates two (2) azimuths by each of the delay values, and calculates total six (6) candidate azimuths, i.e., azim 11, azim 12, azim 21, azim 22, azim 31 and azim 32.

The position information generation unit 26 generates a histogram 101 by using azim 11 and azim 12, a histogram 102 by using azim 21 and azim 22, and a histogram 103 by using azim 31 and azim 32. In this case, in azim ij, i means each channel (or a microphone), and j means an identification number of each of the two (2) estimated azimuths. In addition, the position information generation unit 26 generates each of the histograms by using a Gaussian function, in which the two (2) candidate azimuths of each of the pairs are mean. In addition, θ refers to a circular index, and a circular index of 360 or more starts from 0 again.

The position information generation unit 26 makes three (3) histograms and accumulates all the histograms to generate an accumulated Gaussian histogram 104.

With reference to FIG. 10d, the position information generation unit 26 estimates six (6) candidate azimuths by each frame, and selects an azimuth having the highest frequency from the candidate azimuths of the whole frames as a final azimuth. To this end, the position information generation unit 26 may compare accumulated Gaussian histograms by the multiple number of the frames. In this case, it is preferable to determine an azimuth having the largest frequency value among the estimated candidate azimuths by inspecting all the frames with the same method to be a final azimuth. In addition, if the Gaussian histograms obtained by accumulating the three (3) pairs in one frame are accumulated once more over the multiple frames, the most estimated angle value can be obtained. In general, in consideration of an energy size or an effect of environmental reverberation, calculating an azimuth with only one or two frames may deteriorate reliability.

The position information generation unit 26 generates the final azimuth as position information. In this case, with reference to FIG. 10e, the position information generation unit 26 may increase the azimuth from 0°, which is the center point of the microphones 1 and 3, in the clockwise direction, after assuming that the encoding apparatus 10 or the mobile device 80 is sufficiently far away, and the sound wave is incident in a form of a plane wave.

In the descriptions above, S901 to S903 may be divided into additional steps or combined with one another to be a narrower scope of steps in accordance with example embodiments. In addition, parts of the steps may be omitted according to necessity, and the sequence of the steps may be changed.

Figure 11:
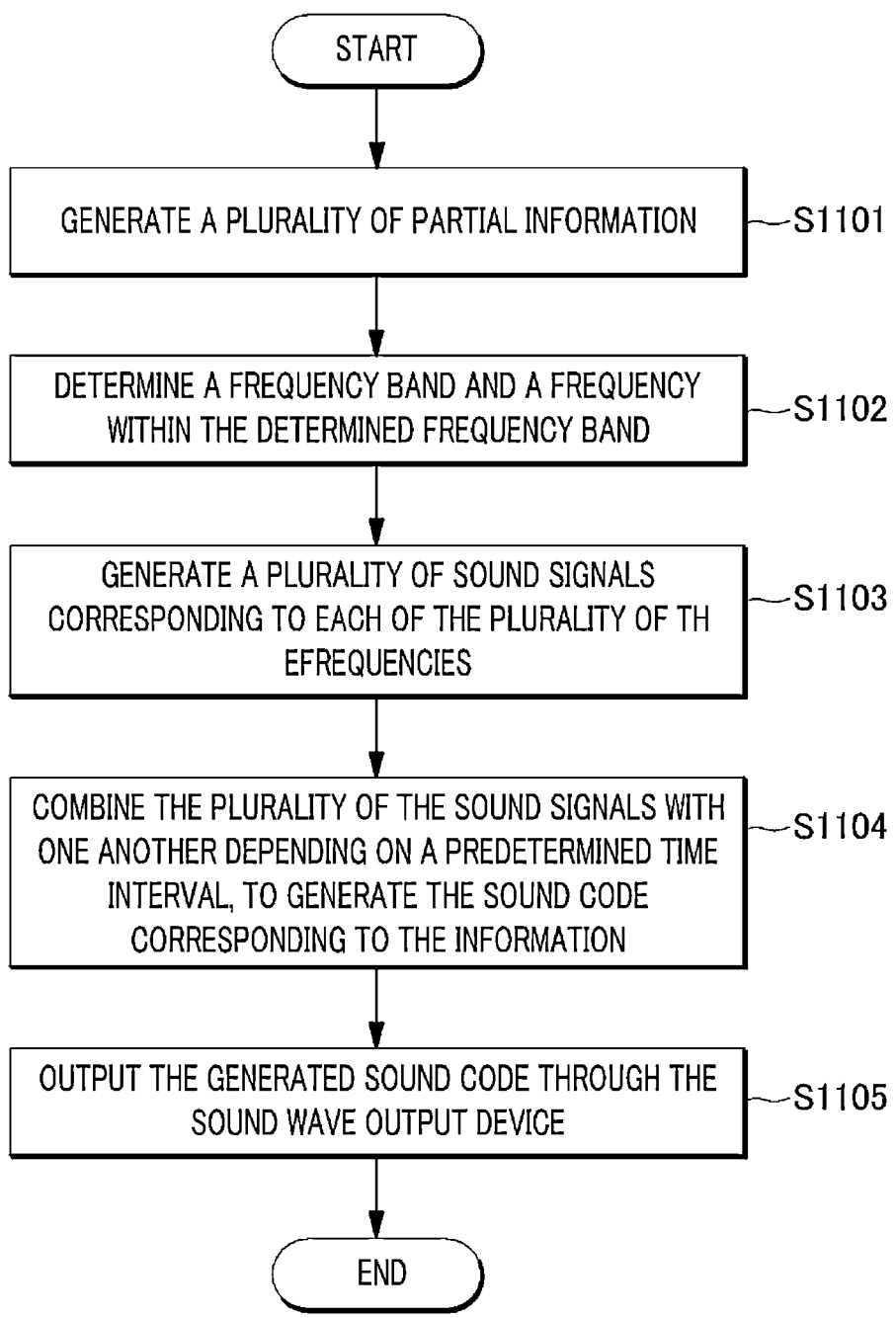
FIG. 11 is an operation flow chart showing a sound code encoding method in accordance with an example embodiment.

FIG. 11 is an operation flow chart showing a sound code encoding method in accordance with an example embodiment. The sound code encoding method illustrated in FIG. 11 includes the sequential processes performed in the encoding apparatus 10 of FIG. 2. Accordingly, the descriptions of the encoding apparatus 10 that have been provide with reference to FIG. 1 to FIG. 10 are also applied to FIG. 11, even though the descriptions are omitted hereinafter.

In S1101, the partial information generation unit 11 generates a multiple number of partial information corresponding to information. In S1102, the frequency determination unit 12 determines a frequency band corresponding to each of the plurality of the partial information from an audible sound wave frequency band and a non-audible sound wave frequency band, and a frequency corresponding to each of the multiple number of the partial information within the determined frequency band. In S1103, the sound signal generation unit 13 generates a multiple number of sound signals corresponding to the multiple number of the frequencies, respectively. In S1104, the sound code generation unit 14 generates a sound code corresponding to information, by combining the multiple number of the sound signals depending on a preset time interval. In S1105, the output unit 15 outputs the generated sound code through the sound wave output device. In the descriptions above, S1101 to S1105 may be divided into additional steps, or combined with each other to be a narrower scope of steps. In addition, parts of the steps may be omitted according to necessity, or the sequence of the steps may be changed.

FIG. 12 is an operation flow chart showing a sound code decoding method in accordance with an example embodiment. The sound code decoding method illustrated in FIG. 12 includes the sequential processes performed in the decoding apparatus 20 of FIG. 5. Accordingly, the descriptions of the decoding apparatus 20 that have been provided with respect to FIG. 1 to FIG. 10 are also applied to FIG. 12, even though the descriptions are omitted hereinafter.

In S1201, the sound code input unit 21 receives the sound code output from the encoding apparatus through the sound wave reception device. In S1202, the frame division unit 22 divides the sound code into a multiple number of frames depending on a present time interval. In S1203, the frequency identification unit 23 identifies a frequency corresponding to each of the multiple number of the frames through frequency analysis for each of the multiple number of the frames. In S1204, the frequency identification unit 23 determines a frequency band, to which each of the identified frequencies corresponds, from an audible sound wave frequency band and a non-audible sound wave frequency band, and a plurality of partial information based on the frequency band and each of the identified frequencies. In S1205, the information generation unit 24 generates information corresponding to the sound code based on the multiple number of the partial information corresponding to the identified frequencies, respectively.

In the descriptions above, S1201 to S1205 may be divided into additional steps or combined with one another to be a narrower scope of steps in accordance with example embodiments. In addition, parts of the steps may be omitted according to necessity, and the sequence of the steps may be changed.

The sound code encoding method described by using FIG. 11 and the sound code decoding method described by using FIG. 12 can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A decoding apparatus for generating information by decoding a sound code, the decoding apparatus comprising:
   a sound code input unit configured to receive a sound code output from an encoding apparatus through a sound wave reception device;
   a frame division unit configured to divide the sound code depending on a predetermined time interval to generate a plurality of frames;
   a frequency identification unit configured to identify a frequency corresponding to each of the plurality of the frames through frequency analysis for each of the plurality of the frames; and
   an information generation unit configured to determine a frequency band, to which each of the identified frequencies corresponds, from an audible sound wave frequency band and a non-audible sound wave frequency band, and a plurality of partial information based on the frequency band and each of the identified frequencies, and generate information corresponding to the sound code based on the plurality of the partial information,
   wherein when the determined plurality of partial information include a preset partial information, the information generation unit is further configured to identically interpret the preset partial information with at least one of the plurality of partial information.

2. The decoding apparatus of claim 1,
   wherein the frequency identification unit identifies first and second frequencies corresponding to a first frame of the plurality of the frames, and
   the information generation unit determines a frequency band, to which the first and second frequencies correspond, and first partial information among the plurality of the partial information based on the first and second frequencies.

3. The decoding apparatus of claim 1,
   wherein the partial information is at least one of a character, a numeral and a sign corresponding to each of the identified frequencies.

4. The decoding apparatus of claim 1,
   wherein the frequency identification unit identifies the frequency based on an energy value corresponding to each of the plurality of the frames.

5. The decoding apparatus of claim 1,
   wherein the information is control information, and
   the decoding apparatus further comprises an operation performance unit that performs operation corresponding to the control information.

6. The decoding apparatus of claim 1,
   wherein the frequency identification unit analyzes a frequency peak for each of the plurality of the frames.

7. The decoding apparatus of claim 1, further comprising a voice recognition unit that performs voice recognition for voice of a user received through the sound wave reception device,
   wherein the information generation unit generates the information based on the plurality of the partial information and the voice recognition.

8. The decoding apparatus of claim 7,
   wherein a frequency of the sound code and a frequency of the voice corresponding to the audible sound wave frequency band are selected within a range of from 100 Hz or more to 8000 Hz or less, and
   the frequency of the sound code corresponding to the non-audible sound wave frequency band is selected within a range from 15000 Hz or more to 24000 Hz or less.

9. The decoding apparatus of claim 8,
   wherein each of the identified frequencies has a difference of at least 200 Hz within the non-audible sound wave frequency band.

10. The decoding apparatus of claim 1, further comprising a position information generation unit that generates position information of the encoding apparatus by using a plurality of sound wave reception devices, and
    an operation performance unit that performs operation toward the position of the encoding apparatus based on the position information.

11. The decoding apparatus of claim 10,
    wherein the position information generation unit generates the position information based on a difference of times when the sound code is input into each of the plurality of the sound wave reception devices.

12. The decoding apparatus of claim 11,
    wherein the position information is an azimuth between at least one of the plurality of the sound wave reception devices and the decoding apparatus, and the encoding apparatus.

13. A method for generating information by decoding a sound code, the method comprising:
    receiving a sound code output from an encoding apparatus through a sound wave reception unit;
    dividing the sound code depending on a predetermined time interval to generate a plurality of frames;
    identifying a frequency corresponding to each of the plurality of the frames through frequency analysis for each of the plurality of the frames;
    determining a frequency band, to which each of the identified frequencies corresponds, from an audible sound wave frequency band and a non-audible sound wave frequency band, and a plurality of partial information based on the frequency band and each of the identified frequencies; and
    generating information corresponding to the sound code based on the plurality of the partial information,
    wherein when the determined plurality of partial information include a preset partial information, the preset partial information is identically interpreted with at least one of the plurality of partial information.

14. An encoding apparatus for encoding a sound code corresponding to information, the encoding apparatus comprising:
    a partial information generation unit configured to generate a plurality of partial information corresponding to the information;

a frequency determination unit configured to determine a frequency band corresponding to each of the plurality of the partial information from an audible sound wave frequency band and a non-audible sound wave frequency band, and a frequency corresponding to each of the plurality of the partial information within the determined frequency band;

a sound signal generation unit configured to generate a plurality of sound signals corresponding to each of the plurality of the frequencies;

a sound code generation unit configured to generate the sound code corresponding to the information, by combining the plurality of the sound signals depending on a predetermined time interval; and an output unit configured to output the generated sound code through a sound wave output device, wherein when the generated plurality of partial information include at least two identical partial information, the frequency determination unit is configured to determine a frequency band of one of the at least two identical partial information to be a preset specific frequency.

15. The encoding apparatus of claim 14, wherein the frequency determination unit determines a frequency band corresponding to first partial information among the plurality of the partial information, and first and second frequencies within the determined frequency band, and the sound signal generation unit that generates a first sound signal corresponding to the first and second frequencies among the plurality of the sound signals.

16. The encoding apparatus of claim 14, wherein a frequency of the sound code corresponding to the audible sound wave frequency band is selected within a range of from 100 Hz or more to 8000 Hz or less, and a frequency of the sound code corresponding to the non-audible sound wave frequency band is selected within a range of from 15000 Hz or more to 24000 Hz or less.

17. A method for encoding a sound code corresponding to information, the method comprising:

generating a plurality of partial information corresponding to the information;

determining a frequency band corresponding to each of the plurality of the partial information from an audible sound wave frequency band and a non-audible sound wave frequency band, and a frequency corresponding to each of the plurality of the partial information within the determined frequency band;

generating a plurality of sound signals corresponding to each of the plurality of the frequencies;

combining the plurality of the sound signals with one another depending on a predetermined time interval, to generate the sound code corresponding to the information; and outputting the generated sound code through the sound wave output device, wherein when the generated plurality of partial information include at least two identical partial information, a frequency band of one of the at least two identical partial information is determined to be a preset specific frequency.

* * * * *